United States Patent [19]
Ksoll et al.

[11] Patent Number: 5,391,363
[45] Date of Patent: * Feb. 21, 1995

[54] CONTINUOUS PURIFICATION OF AN OFF-GAS COMPOSED OF $CO_2+HCL+COCL_2$

[75] Inventors: Peter Ksoll, Dossenheim; Wolfgang Reuther, Heidelberg; Peter Wittmer, Neustadt, all of Germany

[73] Assignee: BASF Aktiengesellschaft, Ludwigshafen, Germany

[*] Notice: The portion of the term of this patent subsequent to Apr. 6, 2010 has been disclaimed.

[21] Appl. No.: 943,023

[22] Filed: Sep. 10, 1992

[30] Foreign Application Priority Data

Sep. 13, 1991 [DE] Germany ............................. 4130427

[51] Int. Cl.$^6$ ............................................. C01B 7/00
[52] U.S. Cl. .................................. 423/240 R; 423/481; 422/168
[58] Field of Search .................. 423/240 R, 481, 488; 55/71; 422/168

[56] References Cited

U.S. PATENT DOCUMENTS 3,798,875  3/1974  Morris .............................. 423/240 R
4,230,681  10/1980  Coenen et al. ....................... 423/481
5,200,163  4/1993  Henkelmann et al. ............... 423/481

Primary Examiner—Benjamin R. Fuller
Assistant Examiner—Valerie Lund
Attorney, Agent, or Firm—Keil & Weinkauf

[57] ABSTRACT

A continuous process for purifying an off-gas which contains $CO_2$ and HCl and $COCl_2$. The process comprises passing the off-gas through a separator filled with N,N-dialkylformamide and HCl. This causes a reaction between the $COCl_2$ and the N,N-dialkylformamide to give the Vilsmeier complex (adduct of $COCl_2$ and dialkylformamide) and $CO_2$. The $CO_2$ leaving the separator contains small amounts of HCl.

1 Claim, 1 Drawing Sheet

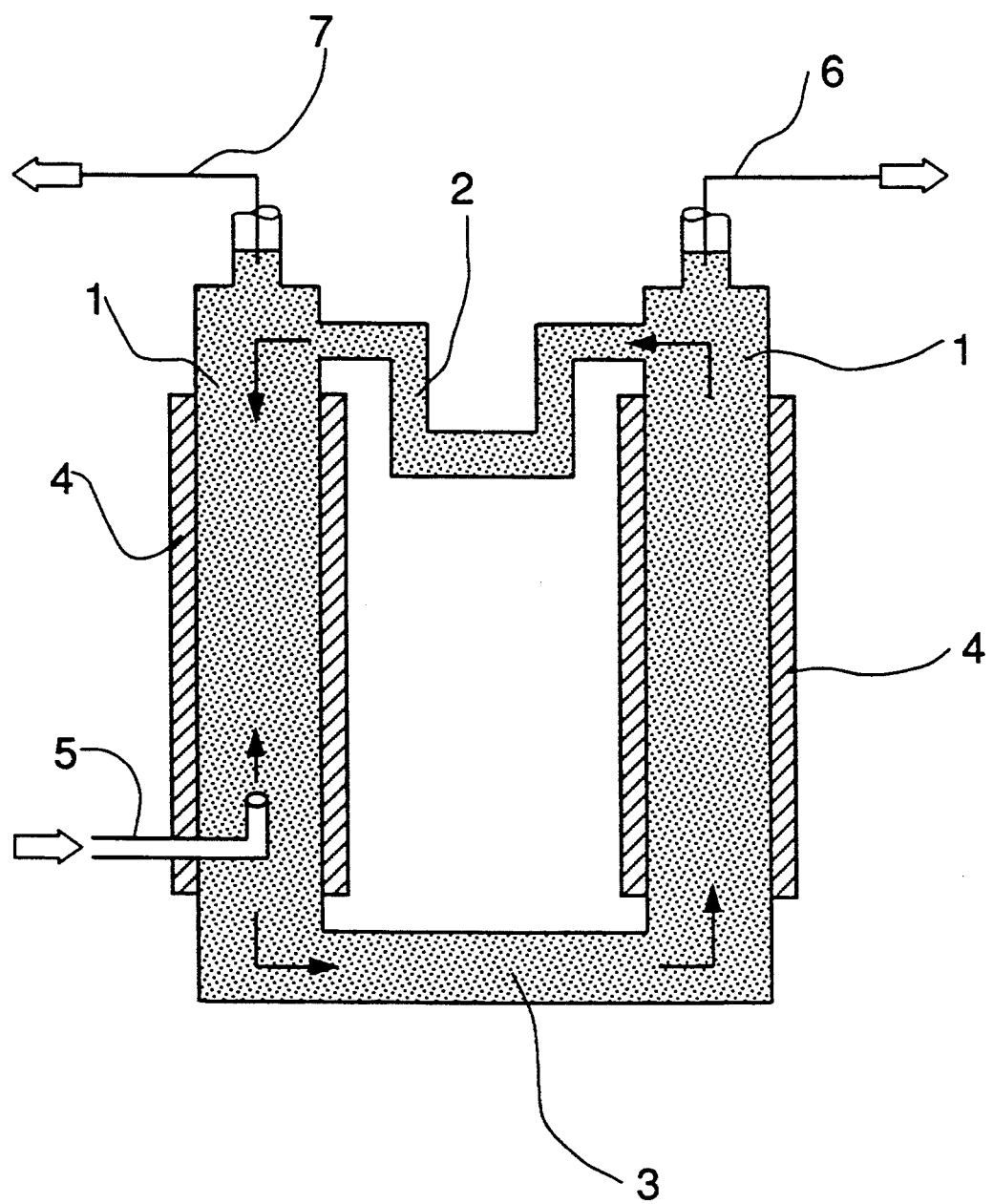

CONTINUOUS PURIFICATION OF AN OFF-GAS COMPOSED OF $CO_2 + HCL + COCL_2$

BACKGROUND OF THE INVENTION

1. Field of the Invention

The present invention relates to a continuous process for purifying an off-gas composed of $CO_2 + HCl + COCl_2$.

This off-gas mixture is produced, for example, in the preparation of carbonyl chlorides.

Carbonyl chlorides are prepared as shown by the following equation:

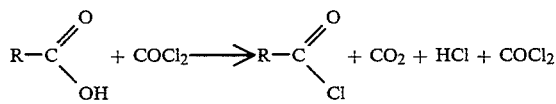

where $COCL_2$ is introduced in excess into the reaction, and N,N-dialkylformamide is used as catalyst.

2. Description of Related Art

The off-gas from the reaction is thus composed of $CO_2$, HCl and unreacted $COCl_2$.

In the prior art, the above off-gas mixture is scrubbed with water with added ammonia in scrubbers packed with active carbon. The recovery or disposal of the HCl resulting from this is complicated and therefore cost-intensive.

SUMMARY OF THE INVENTION

It is an object of the present invention to purify above off-gas mixture in a straightforward, lower-cost way, which means removing the HCl from the off-gas mixture and simultaneously utilizing the $COCl_2$ which is otherwise lost.

We have found that this object is achieved by using a separator filled with N,N-dialkylformamide$\times$HCl wherein $COCl_2$ is reacted with N,N-dialkylformamide to give the Vilsmeier complex+$CO_2$, and $CO_2$/HCl and HCl separately are removed from the separator.

BRIEF DESCRIPTION OF THE DRAWINGS

One example of the invention with the essential inventive features is depicted in the drawing and is described in detail hereinafter. The drawing illustrates the principle of the process and the design of the separator.

DESCRIPTION OF THE PREFERRED EMBODIMENTS

The separator comprises two vertical pipes 1 which are connected together at the top by a U pipe 2 and at the bottom by a straight pipe 3. The two vertical pipes are each jacketed with thermostats 4, and the thermostats keep one pipe at about 20° C. and the other pipe at about 60° C. The entire separator is filled with N,N-dialkylformamide (called DFM hereinafter)$\times$HCl, and the DMF$\times$HCl circulates in the two vertical pipes owing to the 20°–60° C. temperature gradient.

The off-gas mixture is passed via a connector 5 into the pipe at 20° C. in countercurrent to the circulation in the separator. This results in adsorption of the HCl by DFM$\times$HCl. The resulting DFM$\times$2HCl flows into the pipe at 60° C. and is there thermally decomposed to DFM$\times$HCl and HCl. The HCl escapes through the connector 6, and its purity is analyzed by FT-IR spectroscopy.

$CO_2$ does not form a compound with DFM$\times$HCl and escapes through the connector 7 on the pipe at 20° C. A small amount of HCl is carried out with this. This stream is also analyzed by FT-IR spectroscopy.

By contrast, $COCl_2$ reacts with DFM$\times$HCl as shown by the following equation:

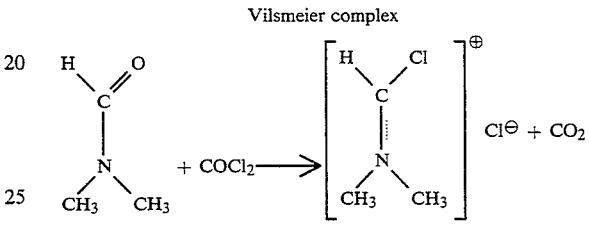

$CO_2$ likewise escapes through the connector 7 from the separator, while the Vilsmeier complex can be used, after a certain concentration in the separator, for converting carboxylic acids into carbonyl chlorides.

It is evident from what has been said that the separator according to the invention can be used to remove in a straightforward manner HCl from the off-gas mixture, and to make $COCL_2$ available for reuse.

EXAMPLE

A separator as described above with a capacity of 1.2 l is filled with 8 mol of N,N-diethylformamide, called DEF hereinafter. DEF$\times$HCl is produced by metering in 8 mol of HCl. After this single preparation of the DEF$\times$HCl and the adjustment of the separator to the appropriate temperatures, the purification of the off-gas mixture can start. About 100 l of off-gas mixture per hour are passed through the separator. $CO_2$ with less than 10% of the HCl is discharged from the cooler pipe. The $COCl_2$ content in this $CO_2$/HCl mixture is below the detection limit of 0.01%. More than 90% of the HCl introduced with the off-gas mixture is transported into the tube at 60° C. After the thermal decomposition of the DEF$\times$2HCl, the escaping CHl has a purity exceeding 99%.

We claim:

1. A continuous process for purifying an off-gas comprising $CO_2$, HCl and $COCl_2$, which process comprises the steps of passing the off-gas through a separator filled with N,N-dialkylformamide and HCl, producing $CO_2$ and an adduct of $COCl_2$ and N,N-dialkylformamide, and removing the $CO_2$ from the separator, which $CO_2$ contains a minor amount of HCl.

* * * * *